(12) United States Patent
Lahlou et al.

(10) Patent No.: US 12,346,824 B2
(45) Date of Patent: *Jul. 1, 2025

(54) EMBEDDING CONSTRAINED AND UNCONSTRAINED OPTIMIZATION PROGRAMS AS NEURAL NETWORK LAYERS

(71) Applicant: Capital One Services, LLC, McLean, VA (US)

(72) Inventors: Tarek Aziz Lahlou, McLean, VA (US); Christopher Larson, Washington, DC (US); Oluwatobi Olabiyi, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,271

(22) Filed: Apr. 22, 2024

(65) Prior Publication Data

US 2024/0346332 A1 Oct. 17, 2024

Related U.S. Application Data

(63) Continuation of application No. 18/079,588, filed on Dec. 12, 2022, now Pat. No. 12,001,961, which is a
(Continued)

(51) Int. Cl.
*G06F 17/00* (2019.01)
*G06F 17/11* (2006.01)
(Continued)

(52) U.S. Cl.
CPC ............... *G06N 3/10* (2013.01); *G06F 17/11* (2013.01); *G06F 17/16* (2013.01); *G06N 3/044* (2023.01)

(58) Field of Classification Search
CPC .......... G06N 3/10; G06N 3/044; G06N 3/045; G06N 5/01; G06N 3/084; G06F 17/11; G06F 17/16
(Continued)

(56) References Cited

U.S. PATENT DOCUMENTS 9,864,731 B2   1/2018   Baran et al.
11,003,992 B2  5/2021   Wesolowski et al.
(Continued)

OTHER PUBLICATIONS

Agrawal et al., "Differentiable Convex Optimization Layers". 33rd Conference on Neural Information Processing Systems (NeurIPS 2019), Vancouver, Canada, 19 pp.
(Continued)

*Primary Examiner* — Russell S Glass
(74) *Attorney, Agent, or Firm* — Banner & Witcoff, Ltd.

(57) ABSTRACT

Aspects discussed herein may relate to methods and techniques for embedding constrained and unconstrained optimization programs as layers in a neural network architecture. Systems are provided that implement a method of solving a particular optimization problem by a neural network architecture. Prior systems required use of external software to pre-solve optimization programs so that previously determined parameters could be used as fixed input in the neural network architecture. Aspects described herein may transform the structure of common optimization problems/programs into forms suitable for use in a neural network. This transformation may be invertible, allowing the system to learn the solution to the optimization program using gradient descent techniques via backpropagation of errors through the neural network architecture. Thus these optimization layers may be solved via operation of the neural network itself.

20 Claims, 6 Drawing Sheets

Related U.S. Application Data continuation of application No. 16/791,945, filed on Feb. 14, 2020, now Pat. No. 11,544,572.

(60) Provisional application No. 62/806,341, filed on Feb. 15, 2019.

(51) Int. Cl.
  *G06F 17/16* (2006.01)
  *G06N 3/044* (2023.01)
  *G06N 3/10* (2006.01)

(58) Field of Classification Search
  USPC .......................................................... 706/27

See application file for complete search history.

(56) References Cited

U.S. PATENT DOCUMENTS

| | | | |
|---|---|---|---|
| 11,694,060 B2* | 7/2023 | Hinton | G06N 3/09 706/27 |
| 2013/0132315 A1* | 5/2013 | Principe | G06F 18/22 706/20 |
| 2018/0024968 A1 | 1/2018 | Clinchant et al. | |
| 2018/0218502 A1 | 8/2018 | Golden et al. | |
| 2018/0268015 A1 | 9/2018 | Sugaberry | |
| 2019/0180375 A1 | 6/2019 | Huang et al. | |
| 2019/0258936 A1* | 8/2019 | Shamir | G06N 5/01 |
| 2020/0184337 A1 | 6/2020 | Baker | |
| 2021/0073959 A1 | 3/2021 | Elmalem et al. | |
| 2022/0066456 A1 | 3/2022 | Ebrahimi Afrouzi et al. | |

OTHER PUBLICATIONS

"Convex optimization" Wikipedia https://en.wikipedia.org/wiki/Convex_optimization website visited Jun. 9, 2022, pp. 1-9.

* cited by examiner

300
$$f(\mathbf{a}) = \begin{cases} 0, & l \leq \mathbf{a} \leq u \\ \infty, & \text{otherwise} \end{cases}$$
FIG. 3A
310
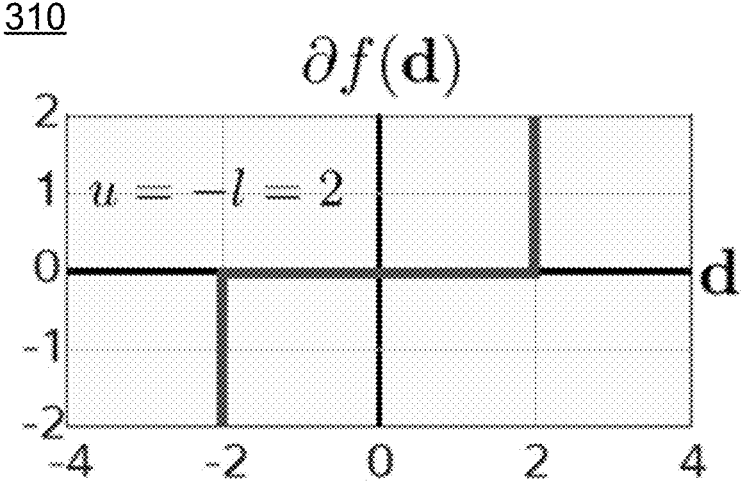
FIG. 3B
320
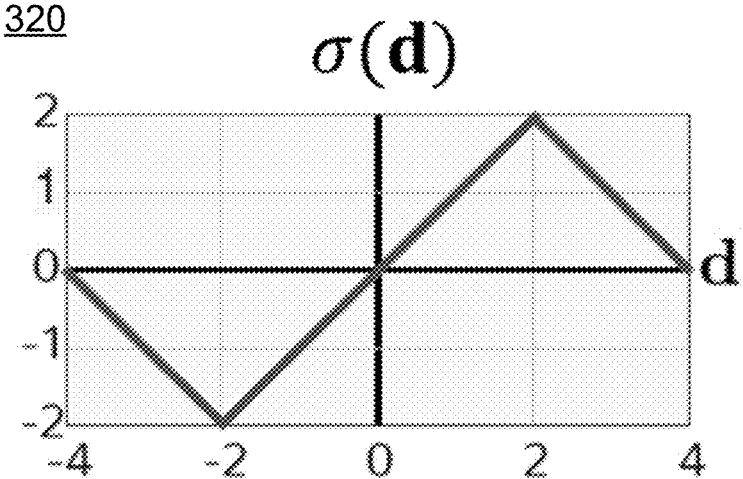
FIG. 3C

EMBEDDING CONSTRAINED AND UNCONSTRAINED OPTIMIZATION PROGRAMS AS NEURAL NETWORK LAYERS

REFERENCE TO RELATED APPLICATIONS

This application claims priority to U.S. patent application Ser. No. 18/079,588, filed Dec. 12, 2022 which claims priority to U.S. patent application Ser. No. 16/791,945, filed Feb. 14, 2020 (now U.S. Pat. No. 11,544,572) which claims priority as a non-provisional of U.S. Provisional Patent Application No. 62/806,341, titled "Embedding Constrained and Unconstrained Optimization Programs as Neural Network Layers" and filed on Feb. 15, 2019, the disclosure of which is incorporated herein by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD AND BACKGROUND OF THE INVENTION

Aspects of the disclosure relate generally to machine learning. More specifically, aspects of the disclosure may allow for the embedding of convex optimization programs in neural networks as a network layer, and may allow the neural network to learn one or more parameters associated with the optimization program.

Neural networks and their constitutive layers often specify input-output relationships such that training procedures can readily identify parameter values well-suited to given datasets and tasks. Often these relationships are chosen to be analytic and differentiable to ensure gradient-based training methods are effective. Solving optimization programs in their original forms may be difficult for neural networks, particularly regarding those optimization programs with input constraints establishing permitted/feasible and/or unpermitted/infeasible values, because the constraints may cause the derivative and/or subdifferential of the optimization program function to be ill-defined over the range of input that the neural network may encounter.

Aspects described herein may address these and other problems, and generally improve the quality, efficiency, and speed of machine learning systems. Further, aspects herein provide a practical application of the transformations used to place optimization programs in suitable form for neural network processing.

BRIEF STATEMENT OF THE INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure relate to a procedure for mapping optimality conditions associated with a broad class of optimization problems including linear optimization programs and quadratic optimization programs, and more generally convex optimization programs, onto neural network structures using Cayley transforms. This may guarantee that these networks find solutions for convex problems.

Aspects discussed herein may relate to methods and techniques for embedding constrained and unconstrained optimization programs as layers in a neural network architecture. Systems are provided that implement a method of solving a particular optimization problem by a neural network architecture. Prior systems required use of external software to pre-solve optimization programs so that previously determined parameters could be used as fixed input in the neural network architecture. Aspects described herein may transform the structure of common optimization problems/programs into forms suitable for use in a neural network. This transformation may be invertible, allowing the system to learn the solution to the optimization program using gradient descent techniques via backpropagation of errors through the neural network architecture. Thus these optimization layers may be solved via operation of the neural network itself. This may provide benefits such as improved prediction accuracy, faster model training, and/or simplified model training, among others. Features described herein may find particular application with respect to convex optimization programs, and may find particular application in recurrent neural network architectures and/or feed-forward neural network architectures.

More particularly, some aspects described herein may provide a computer-implemented method for embedding a convex optimization program as an optimization layer in a neural network architecture comprising a plurality of layers. According to some aspects, a computing system implementing the method may determine a set of parameters associated with the convex optimization program. The set of parameters may comprise a vector $a=(a_1, a_2)$ of primal decision variables associated with the convex optimization program and a vector $b=(b_1, b_2)$ of dual decision variables associated with the convex optimization program. Vectors a and b may be related according to:

$$Aa_1 = a_2 \text{ and } b_1 = -A^T b_2$$

where A is a coefficient matrix corresponding to one or more constraints of the convex optimization program, and $A^T$ denotes the transpose of matrix A. The system may determine a set of intermediary functionals $f_i=(f_1, f_2)$. The value of $f_i$ may be defined as equal to a cost term associated with a corresponding $a_i$ for a range of permitted values of $a_i$ and equal to infinity for a range of unpermitted values of $a_i$. The one or more constraints of the convex optimization program may define the range of permitted values and the range of unpermitted values. The system may generate a set of network variables associated with the optimization layer based on applying a scattering coordinate transform to vectors a and b. The set of network variables may comprise a vector $c=(c_1, c_2)$ corresponding to input to the optimization layer and a vector $d=(d_1, d_2)$ corresponding to an intermediate value of the optimization layer.

The system may generate a linear component H of the optimization layer by applying a first transformation to coefficient matrix A, where the first transformation is of the form:

$$H = \begin{bmatrix} I & -A^T \\ A & I \end{bmatrix} \begin{bmatrix} I & A^T \\ -A & I \end{bmatrix}^{-1}$$

where I is the identity matrix. The linear component H may correspond to a linear mapping, linear operator, and/or weight matrix, and may be used in the optimization layer to determine an intermediate value for d corresponding to a given value for c.

The system may generate a non-linear component $\sigma(\cdot)$ of the optimization layer by applying a second transformation to the intermediary functionals $f_i$, where the second transformation is of the form:

$$\sigma_i(d_i) = (-1)^i (\partial f_i - I)(I + \partial f_i)^{-1}(d_i), i = 1, 2,$$

where $\partial f_i$ corresponds to the subdifferential of $f_i$. The non-linear component $\sigma(\cdot)$ may correspond to a non-linear mapping, non-linear operator, and/or non-linear transformation, and may be used in the optimization layer to determine a next iteration value of c based on application to a current iteration value for d.

The system may receive, by the optimization layer and from a prior layer of the neural network architecture, input values corresponding to vector c. The system may iteratively compute, by the optimization layer, values for vectors c and d to determine fixed point values c* and d*. Each computation of a value for vectors c and d may be of the form:

$$d^n = Hc^n \text{ and } c^{n+1} = \sigma(d^n)$$

where n demotes the n-th iteration of the optimization layer, and $c^n$ and $d^n$ denote the n-th value for vectors c and d. The system may determine fixed point values a* and b* based on applying the inverse of the scattering coordinate transform to fixed point values c* and d*.

The system may provide, by the optimization layer, output based on fixed point values a* and b*. An error between a predicted output of the neural network architecture and an expected output for training data used during a training process may be determined. The system may backpropagate the determined error through the plurality of layers as part of a machine learning process. The system may determine an updated set of parameters associated with the convex optimization program based on applying gradient descent to the linear component H and the non-linear component $\sigma(\cdot)$. A trained model may be generated as a result of repeated iterations of a machine learning process using the neural network architecture having the optimization layer described above. The trained model may be used to generate one or more predictions based on a trained set of parameters associated with the convex optimization program.

Techniques described herein may flexibly be applied to any suitable neural network architecture. For example, techniques described herein may find application in neural network architectures such as convolutional neural networks, recurrent neural networks, feed forward neural networks, and the like, and combinations thereof. Similarly, techniques described herein may be applied to any suitable machine learning application, such as speech recognition, image recognition, and others.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A, 3B, and 3C depict an exemplary optimization constraint and corresponding subgradient relations according to one or more aspects of the disclosure;

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects described herein may provide a method for designing neural networks that solve linear and quadratic programs during inference using standard deep learning framework components. These networks are fully differentiable, allowing them to learn parameters for constraints and objective functions directly from backpropagation, thereby enabling their use within larger end-to-end networks. Aspects of this disclosure are discussed generally with respect to convex optimization programs. Illustrative examples of standard-form linear and quadratic optimization programs are discussed, as well as programs appearing in signal recovery and denoising contexts.

Before discussing these concepts in greater detail, however, several examples of a computing device that may be used in implementing and/or otherwise providing various aspects of the disclosure will first be discussed with respect to FIG. 1.

Figure 1:
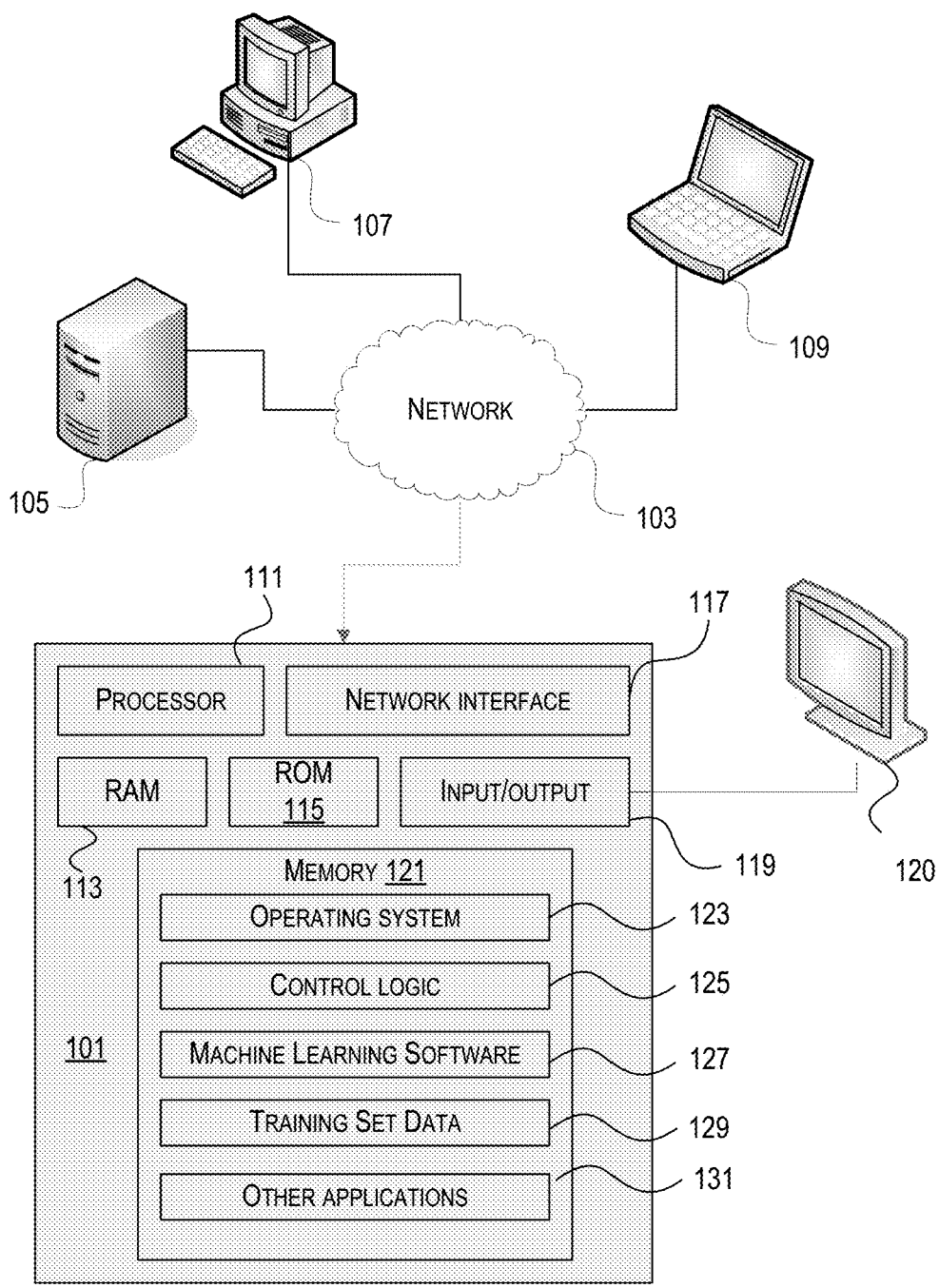
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for embedding convex optimization programs in neural network layers.

Figure 2:
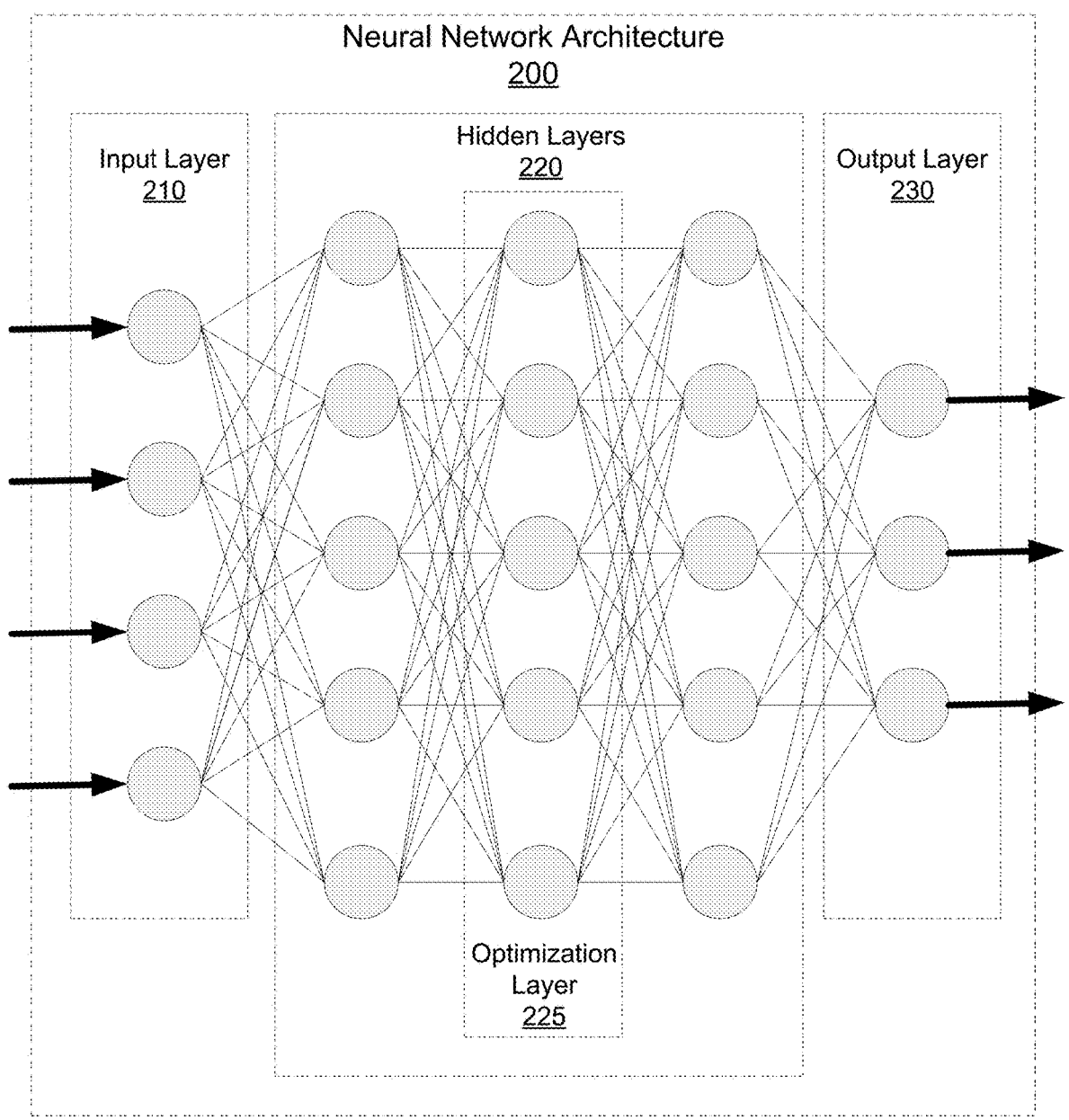
FIG. 2 depicts an example neural network architecture for a model according to one or more aspects of the disclosure.

FIG. 2 illustrates an example neural network architecture 200. An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. Illustrated network architecture 200 is depicted with three hidden layers. The number of hidden layers employed in neural network 200 may vary based on the particular application and/or problem domain. For example, a network model used for image recognition may have a different number of hidden layers than a network used for speech recognition. Similarly, the number of input and/or output nodes may vary based on the application. Many types of neural networks are used in practice, such as convolutional neural networks, recurrent neural networks, feed forward neural networks, combinations thereof, and others. Aspects described herein may be used with any type of neural network, and for any suitable application.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, gradient descent algorithms that seek to minimize errors in the model.

A problem domain to be solved by the neural network may include an associated optimization program. The optimization program may be constrained and/or unconstrained, and may assign weights and/or penalties to certain input values and/or combinations of input values. The weights (e.g., coefficient matrices) and/or constraints (e.g., maximum values or relations between different inputs) may be referred to as parameters of the optimization program. Solving for these parameters may be necessary to generate suitable predictions in certain problem domains. Convex optimization programs are a class of optimization programs that are commonly encountered in machine learning applications, and aspects herein may find particular application with respect to convex optimization programs. This disclosure discusses the example of input-output relationships characterized by standard-form linear and quadratic optimization programs. Aspects of this disclosure may find application more generally in the context of convex optimization programs.

Linear optimization programs may be those written according to equation (LP):

$$\min_x q^T x$$
$$\text{s.t. } Ax \leq r$$
$$x \geq 0$$

While quadratic optimization programs may be those written according to equation (QP):

$$\min_x \frac{1}{2} x^T Q x + q^T x$$
$$\text{s.t. } Ax \geq r$$

where x is a vector of primal decision variables, q is a cost vector, r is an inequality vector, and A and Q are respectively linear and quadratic coefficient matrices.

Solving optimization programs in their original forms may be difficult for neural networks, particularly regarding those optimization programs with input constraints establishing permitted/feasible and/or unpermitted/infeasible values, because the constraints may cause the derivative and/or subdifferential of the optimization program function to be ill-defined over the range of input that the neural network may encounter. For example, FIG. 3A depicts an illustrative function $f(a)$ 300 that may provide a cost value associated with input vector a. As illustrated, permissible values of vector a may be bounded by variables l and u. Function $f(a)$ 300 may indicate that the cost value is 0 for all permissible values, and infinite otherwise. Applying canonical subgradient approaches to $f(a)$ 300 may not be able to locate a minima by following the gradient descent based on $\partial f(d)$, illustrated in FIG. 3B chart 310 with exemplary constraints l=−2 and u=2. Aspects described herein may apply a transformation to the cost function and parameters of the optimization program to derive a fully differentiable representation of the cost function as described further below, illustrated in FIG. 3C chart 320 with the same exemplary constraints.

Figure 5A:
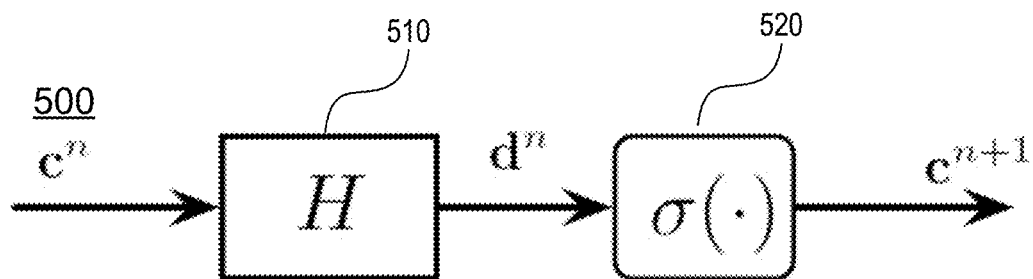
FIGS. 5A and 5B depict exemplary portions of a neural network architecture according to one or more aspects of the disclosure.
Figure 5B:
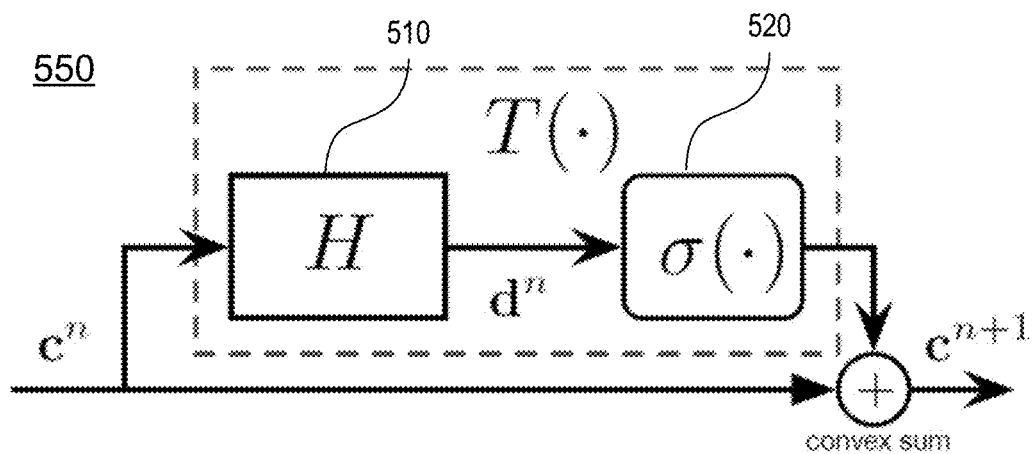

Aspects described herein introduce an optimization layer, such as optimization layer 225 illustrated in FIG. 2, which may be configured such that the optimization program is represented in a form suitable for solving by the processing of the neural network itself. Structures of the optimization layer are illustrated in FIGS. 5A and 5B. The optimization layer may include a linear component and a non-linear component generated by applying the transformations discussed further herein to the parameters of the optimization program, and the components may operate on network variable transformations of the set of parameters for the optimization program. Further details regarding the transformation of the optimization program to the network coordinate system, the generation of the linear and non-linear components of the optimization layer, and the structure and operation of the optimization layer are discussed further below.

Aspects described herein may present a method for solving a particular optimization program by a neural network. Broadly speaking, the system may transform the problem into a neural network structure that can be embedded and trained inside of a larger end-to-end network. An instance of the optimization problem may be solved by executing the network until a fixed-point is identified or another appropriate threshold for what is considered a fixed-point is met. The system may transform the fixed-point back to the original coordinate system, thereby obtaining a trained value relevant to the optimization program.

In particular, the system may transform the problem into a neural network structure that can be embedded and trained inside of a larger end-to-end network by transforming the problem parameters in an invertible and differentiable matter. The problem may be transformed into a direct and/or residual neural network form. A direct form structure may comprise a single matrix multiplication followed by a non-linearity, as illustrated by network structure 500 in FIG. 5A. A residual form structure may comprise the matrix multiplication and non-linearity, but may also have an identity path from the input and a weighted combination of the input and the product of the multiplication and non-linearity, as illustrated by network structure 550 in FIG. 5B. Both the direct and residual forms may make use of standard neural network components, such as fully connected layers, matrix multiplication, and non-linearities such as rectified linear units (ReLUs).

The system may solve an instance of the optimization problem by executing the optimization layer of the network until a fixed-point is identified or an appropriate threshold is met. This may be done in the direct and/or residual forms. The variables operating on in the solving may be specific combinations of primal and dual decision variables rather than the primal or dual variables themselves. The optimization problem parameters can be fixed, pre-defined, and/or learned from data and/or some combination of fixed and learned. The application of the transformations described herein to neural network processing may enable the embedding of an optimization layer allowing the neural network to solve an associated optimization program. The optimization problem may be solved directly in the inference and/or forward pass of the network without requiring the use of external optimization tools.

This procedure may be performed on every forward pass of the network as part of larger network training. The optimization problem parameters may be updated in the same manner that other parameters of the larger network are learned. These features may also allow any neural network inference framework, such as TensorRT from NVIDIA CORP, to be used as a constrained and unconstrained optimization solver. The optimization layer may be configured to run in a recurrent loop to arrive at the fixed-point. In a given iteration of the end-to-end neural network, multiple iterations of the optimization layer may run as a result of the recurrent (and or similar feed forward) structure. The fixed-point results serve as the network variables for the optimization layer for that iteration of the end-to-end neural network, and are updated in the same manner as other parameters, e.g., through gradient descent.

Optimality Conditions

To begin, let $a=(a_1, a_2)$ and $b=(b_1, b_2)$ respectively denote vectors of primal and dual decision variables associated with an optimization program. The linear relationships imposed on the decision variables are enforced according to equation (1):

$$Aa_1 = a_2 \text{ and } b_1 = -A^T b_2$$

where A is a coefficient matrix associated with the constraints of the optimization program, and where $A^T$ denotes the transpose of matrix A.

Equivalently, the linear feasibility constraints imposed on the decision variables a and b above correspond to the behavioral statement shown in equation (2):

$$\begin{bmatrix} a_1 \\ b_1 \\ a_2 \\ b_2 \end{bmatrix} \in \text{range}\left(\begin{bmatrix} I & 0 \\ 0 & -A^T \\ A & 0 \\ 0 & I \end{bmatrix}\right).$$

where I is the identity matrix. Moving forward, the vector subspace in equation (2) is denoted as $\mathcal{V}$.

Next, the remainder of the optimality conditions associated with cost terms and inequality constraints are enforced using a set $\mathcal{F}$ describing admissible configurations of the decision vector (a, b). $\mathcal{F}$ may be decomposed according to $\mathcal{F} = \mathcal{F}_1 \times \mathcal{F}_2$ where each $\mathcal{F}_i$ is a set relation restricting the variables $(a_i, b_i)$ for $i=1, 2$. To generate $\mathcal{F}_i$, an intermediary functional $f_i$ may be defined equal to the cost term associated with $a_i$ over its feasible domain and equal to infinity for infeasible values. For example, the primal vector $a_1$ in equation (LP) is restricted to be elementwise non-negative with cost term $q^T a_1$, therefore the functional $f_1$ is shown in equation (3):

$$f_1(a_1) = \begin{cases} q^T a_1, & a_1 \geq 0 \\ \infty, & \text{otherwise} \end{cases}$$

Figure 4:
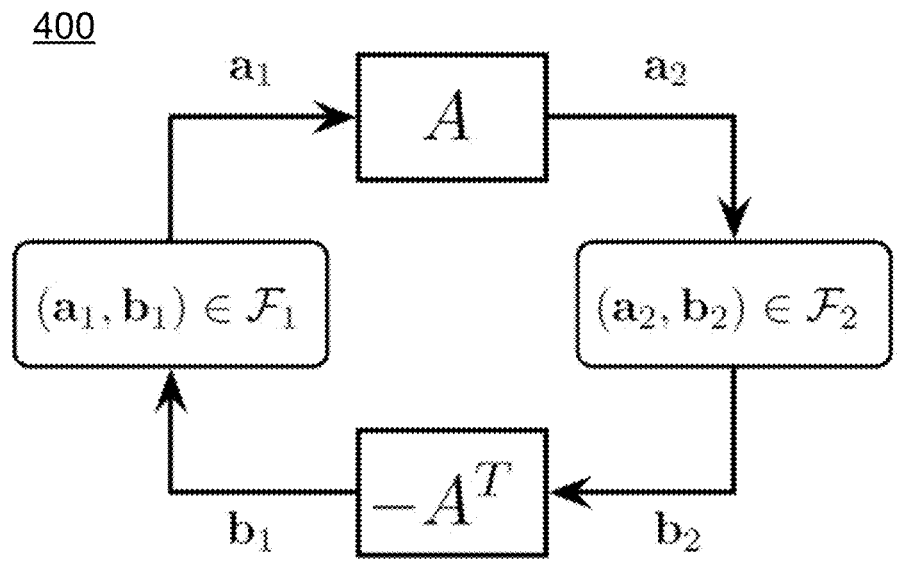
FIG. 4 depicts a visual representation of generalized optimization constraints according to one or more aspects of the disclosure.

The set $\mathcal{F}_i$ is then the set of values $(a_i, b_i)$ where $b_i = \partial f_i(a_i)$ is the subdifferential of $f_i$. A complete description of solutions to the optimality conditions is then the set of elements (a, b) in $\mathcal{V} \cap \mathcal{F}$. FIG. 4 illustrates these optimality conditions graphically in visual representation 400.

Scattering Coordinate Transformations

For non-smooth convex cost functions over general convex sets, the $(a_i, b_i)$ relationship encapsulated by $\mathcal{F}_i$ is not necessarily functional, thus inserting state into the structure in FIG. 1(a) may not yield well-defined iterations or loops. To circumvent this difficulty, aspects may proceed by mapping the optimality conditions onto the neural network structures in FIGS. 5A and 5B. FIG. 5A depicts a direct network structure 500 comprising a linear component H 510 and non-linear component $\sigma(\cdot)$ 520. Linear component H 510 may be a linear mapping, linear operator, and/or weight matrix applied to input network variable c. Non-linear component $\sigma(\cdot)$ 520 may be a non-linear mapping, non-linear operator, and/or non-linear transformation applied to intermediate network variable d. FIG. 5B depicts an residual network structure that also includes linear component H 510 and non-linear component $\sigma(\cdot)$ 520.

Toward this end, network variables $c=(c_1, c_2)$ and $d=(d_1, d_2)$ may be produced from the decision variables a and b according to the scattering coordinate transform shown in equation (4):

$$\begin{bmatrix} c_1 \\ d_1 \\ c_2 \\ d_2 \end{bmatrix} = \underbrace{\begin{bmatrix} I & -I & 0 & 0 \\ I & I & 0 & 0 \\ 0 & 0 & -I & I \\ 0 & 0 & I & I \end{bmatrix}}_{\triangleq M} \begin{bmatrix} a_1 \\ b_1 \\ a_2 \\ b_2 \end{bmatrix}$$

Next, this transform may be reflected onto the optimality conditions by providing analytic expressions for the network parameter matrices H and activation functions $\sigma(\cdot)$ which encapsulate the transformed optimality conditions $M(\mathcal{V} \cap \mathcal{F})$ as well as address issues of their well-posedness. The neural networks can then be unrolled or iterated until fixed-points (c*, d*) are identified which in turn can be used to identify solutions (a*, b*) in the original coordinate system by inverting equation (4).

To assist with the strategy above, note that the transformed behavior $M\mathcal{V}$ is the vector space described by equation (5):

$$\begin{bmatrix} c_1 \\ d_1 \\ c_2 \\ d_2 \end{bmatrix} \in \text{range}\left(\begin{bmatrix} I & A^T \\ I & -A^T \\ -A & I \\ A & I \end{bmatrix}\right)$$

Consistent with the illustration in FIG. 5A, aspects may proceed by mapping the optimization problem to the network structures with the convention that c and d are matrix inputs and outputs, respectively. Therefore, the behavior in equation (5) reduces to the matrix equation shown in equation (6):

$$\begin{bmatrix} d_1 \\ d_2 \end{bmatrix} = \underbrace{\begin{bmatrix} I & -A^T \\ A & I \end{bmatrix} \begin{bmatrix} I & A^T \\ -A & I \end{bmatrix}^{-1}}_{\triangleq H} \begin{bmatrix} c_1 \\ c_2 \end{bmatrix}.$$

This form of H corresponds to the Cayley transform of a skew-symmetric matrix characterizing the dual extension of the matrix A, thus it is both orthogonal and well-defined for arbitrary A. Efficient methods for computing H follow from standard algebraic reduction mechanisms such as the matrix inversion lemma.

Concerning the transformed relation $M\mathcal{F}$, convexity of the functionals $f_i$ paired with the coordinate transform in equation (4) provides that $c_i$ can always be written as a function of $d_i$ for i=1, 2. To see this, let $\sigma_i$ denote the mapping and note that the subgradient relation in $\mathcal{F}_i$ can be transformed and written according to equation (7):

$$\sigma_i(d_i) = (-1)^i(\partial f_i - I)(I + \partial f_i)^{-1}(d_i), i = 1, 2,$$

where $\sigma_i$ is closely related to the Cayley transform of $\partial f_i$. Drawing upon this observation, a well-known result in convex analysis states that since $\partial f_i$ is the subdifferential of a convex function it is monotone, therefore $I+\partial f_i$ is strongly monotone since it is the sum of a monotone and strongly monotone function. Invertibility of the term $I+\partial f_i$, and thus the validity of equation (7) as a well-defined operator, then follows from application of the theorem of Browder-Minty on monotone operators. Moreover, it follows that the $\sigma_i$ is passive or non-expansive, i.e. is Lipschitz continuous with constant not greater than unity.

Convergence Analysis

This disclosure will next show that the iterating the residual structure in FIG. 5B yields solutions to the transformed optimality conditions M $(\gamma \cap \mathcal{F})$ associated with convex problems such as (LP) and (QP). More concretely, it will be shown that the sequence shown in equation (8):

$$c^{n+1} = \rho c^n + \bar{\rho} T(c^n), n \in \mathbb{N},$$

tends to a fixed-point $c^*=T(c^*)$ for $\rho \in (0,1)$ and where $\bar{\rho}=1-\rho$. Once $c^*$ is obtained, it is straightforward to produce $d^*$ using equation (5) from which solutions (a*, b*) can be obtained by inverting equation (4).

For general convex problems, T is non-expansive since it is the composition of an orthogonal matrix H and the non-expansive operator $\sigma$ in equation (7). Therefore, a single iteration of equation (8) yields equation (8.1):

$$\|c^{n+1} - c^*\|^2 = \rho\|c^n - c^*\|^2 + \bar{\rho}\|T(c^n) - c^*\|^2 - \rho\bar{\rho}\|T(c^n) - c^n\|^2 \leq$$
$$\|c^n - c^*\|^2 - \rho\bar{\rho}\|T(c^n) - c^n\|^2$$

where the equality is due to the application of Stewarts Theorem and the inequality is due to both the non-expansivity and fixed-point properties of T. Iterating the inequality yields equation (9):

$$\|c^{n+1} - c^*\|^2 \leq \|c^0 - c^*\|^2 - \rho\bar{\rho}\sum_{i=0}^{n}\|T(c^i) - c^i\|^2.$$

Loosening equation (9) further and taking a limit provides the bound shown in equation (10):

$$\lim_{n\to\infty}\sum_n \|T(c^n) - c^n\|^2 \leq \frac{1}{\rho\bar{\rho}}\|c^0 - c^*\|^2.$$

Since equation (10) is bounded above it follows that $T(c^n) \to c^n$ and therefore $c^n \to c^*$ which concludes the argument of convergence for general convex optimization problems.

For the important special case of strictly convex cost functions over convex sets, the nonlinearity in equation (7) reduces to a contractive mapping. Consequently, T is also contractive and the process of iterating either the direct or residual network structures results in linear convergence to a solution or fixed-point. A proof of this fact follows from direct application of the Banach fixed-point theorem.

Connections to Proximal Algorithms

Proximal iterations for minimizing non-differentiable, convex functions $f:\mathbb{R}^N \to \mathbb{R} \cup \{\infty\}$ take the general form shown in equation (11):

$$x^n = prox_{\rho f}(x^{n-1}), n \in \mathbb{N}$$

where $\rho$ is a tuning parameter and the scaled proximal operator $prox_{\rho f}:\mathbb{R}^N \to \mathbb{R}^N$ is defined according to equation (12):

$$prox_{\rho f}(x) = \Delta \mathrm{argmin}_z f(z) + \frac{1}{2\rho}\|x - z\|^2.$$

To connect the scattering algorithms outlined in this section with their proximal counterparts, it is shown that the proximal operator in equation (12) corresponds to a different transformation of $\mathcal{F}_i$ associated with $f$. In particular, the scaled proximal operator is related to the subgradient $\partial f$ according to equation (13):

$$\begin{bmatrix} prox_{\rho f}(d) \\ d \end{bmatrix} = \begin{bmatrix} I & 0 \\ I & \rho I \end{bmatrix}\begin{bmatrix} x \\ \partial f(x) \end{bmatrix}$$

To prove this relationship holds it must be shown that $d=(I+\rho\partial f)(prox_{\rho f}(d))$. To do this, let $v^*=prox_{\rho f}(d)$ and consider the function $p(v)=f(v)+\frac{1}{2}\rho\|v-d\|^2$. The condition $\partial p(v^*)=0$ then yields the constraint $\rho\partial f(v^*)+v^*=d$ which is precisely the relationship in equation (13). Therefore, proximal and scattering methods are related through different coordinate transformation matrices M.

Example Network Modules

Figure 6A:
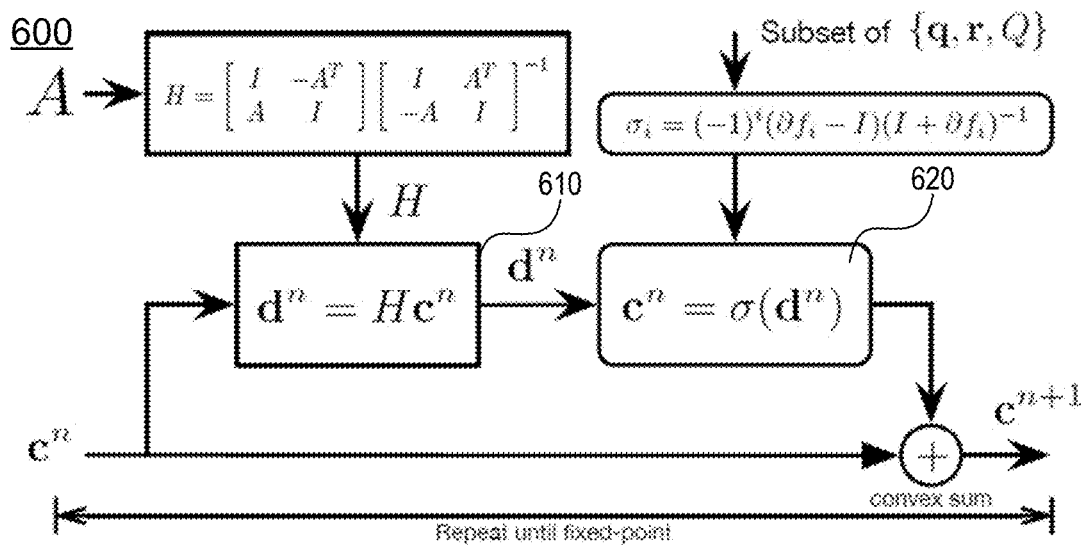
FIGS. 6A and 6B depict exemplary operations in a neural network architecture to derive learned parameters according to one or more aspects of the disclosure.
Figure 6B:
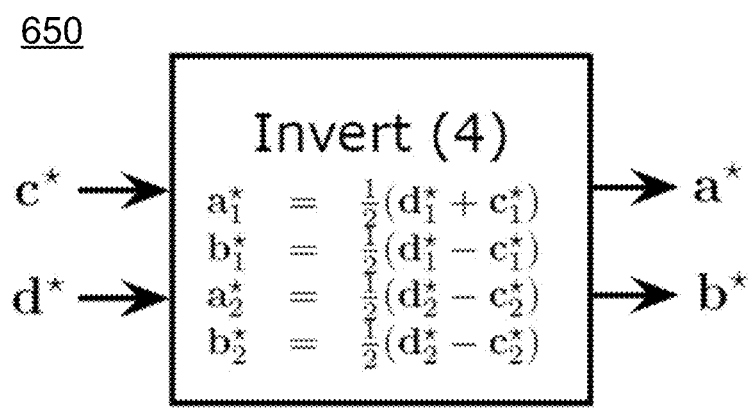

In the following sections, this disclosure explains the derivation of the requisite nonlinearities to build networks that themselves solve specific forms of linear and quadratic programming problems. The forward pass of a residual network is portrayed in FIGS. 6A and 6B, wherein the portion in FIG. 6A is implemented iteratively until a fixed-point is identified from which the portion in FIG. 6B then returns the primal and dual solutions. FIG. 6B illustrates the inverse scattering transform used on fixed-points (c*, d*). Transformations from the parameters A, q, r and Q to produce H and $\sigma$ may only be required for parameters that are either network inputs or to be learned and only done once upon network initialization for those that are static.

Linear Optimization Program Network Modules

The optimality conditions for linear programming problems written in standard form directly map to FIG. 4 with decision variables $(a_1, a_2)=(x, Ax)$. The relation $\mathcal{F}_1$ is generated using the example functional in equation (3) and $\mathcal{F}_2$ uses the indicator functional $f_2$ given by equation (14)

$$f_2(a_2) = \begin{cases} 0, & a_2 \leq r \\ \infty, & \text{otherwise} \end{cases}$$

The nonlinearities for linear optimization program (LP) modules are generated using equation (7) and implemented coordinatewise using the expressions shown in equations (15) and (16):

$$\sigma_1(d_1) = |d_1 - q| - q$$

$$\sigma_2(d_2) = |d_2 - r| - r$$

which are both easily verified to be non-expansive and can be formed using compositions of standard ReLU activations.

Quadratic Optimization Program Network Modules

The optimality conditions for quadratic programming problems written in standard form directly map to FIG. 4 with decision variables $(a_1, a_2)=(x, Ax)$. The relations $\mathcal{F}_i$ correspond to the functionals shown in equations (17) and (18):

$$f_1(a_1) = \frac{1}{2}a_1^T Q a_1 + q^T a_1$$

$$f_2(a_2) = \begin{cases} 0, & a_2 \leq r \\ \infty, & \text{otherwise} \end{cases}$$

The nonlinearities for quadratic optimization program (QP) modules are generated using equation (7) and implemented using the expressions shown in equations (19) and (20):

$$\sigma_1(d_1) = (I - Q)(I + Q)^{-1}(d_1 - q) - q$$

$$\sigma_2(d_2) = |d_2 - r| - r$$

It is straightforward to show that $\sigma_1$ is contractive if Q is positive definite, non-expansive if Q is positive semidefinite, and expansive if Q is indefinite and $\sigma_2$ is coordinatewise non-expansive.

Sparse Signal Recovery Network Modules

In a variety of applications, nonlinear features naturally arise in programs that reduce to (LP) or (QP). Recasting tricks have been developed in response to this. These same tricks may be combined in tandem with the networks in this disclosure. Additionally and/or alternatively, specialized networks can be assembled by designing non-linearities that directly represent the nonlinear features using the procedures described herein.

For example, generating sparse solutions to underdetermined linear systems of equations satisfying certain spectral properties is a linear program often cast as the Basis Pursuit (BP) problem shown in equation (21):

$$\min_x \|x\|_1 \text{ s.t. } Ax = r$$

Moreover, equation (21) has been extended via regularization to handle cases where the measurement vector r contains noise and Ax is only required to be reasonably close to r. This recovery problem is a quadratic program often cast as the Basis Pursuit Denoising problem (BPDN) according to equation (22):

$$\min_x \lambda\|x\|_1 + \frac{1}{2}\|v - r\|_2^2 \text{ s.t. } Ax = v$$

where $\lambda$ balances the absolute size of the solution with the desired agreement of Ax and r. Rather than recasting into standard form by introducing auxiliary variables and additional constraints, aspects may next define the network modules directly from the objective functions. The optimality conditions directly map to FIG. 4 where $(a_1, a_2)=(x, Ax)$ and the relations $\mathcal{F}_i$ produce the nonlinearities shown below in equations (23), (24), and (25):

$$\text{For (21) and (22) } \sigma_1(d_1) = \begin{cases} -d_1, & |d_1| \leq \lambda \\ d_1 - 2\lambda\text{sgn}(d_1), & |d_1| > \lambda \end{cases}$$

$$\text{For (21) } \sigma_2(d_2) = d_2 - 2r$$

$$\text{For (22) } \sigma_2(d_2) = -r$$

The activations in equations (23) and (24) are non-expansive and the activation in equation (25) is contractive with Lipschitz constant equal to zero.

Total Variation Denoising Network Modules

Similar to the recovery of sparse signals, the denoising of certain signal models from noisy measurements is often cast using quadratic programs. As a concrete example of this, the total variation denoising problem attempts to denoise or smooth observed signals y using an approximation x produced according to equation (26):

$$\min_x \frac{1}{2}\|x - y\|_2^2 + \lambda\|v\|_1 \text{ s.t. } Dx = v$$

where the form of the parameter matrix D encodes the targeted signal model and $\lambda$ balances the approximation and model penalties. When D takes the form of a first-order difference operator, i.e. with rows $e_i - e_{i+1}$, the penalty $\|Dx\|_1$ encourages the signal to tend toward a piece-wise constant construction.

The optimality conditions associated with equation (26) directly map to FIG. 4 where $(a_1, a_2)=(x, v)$ and the relations $\mathcal{F}_i$ produce the nonlinearities shown in equations (27) and (28):

$$\sigma_1(d_1) = y$$

$$\sigma_2(d_2) = \begin{cases} -d_2, & |d_2| \leq \lambda \\ 2\lambda\text{sgn}(d_2) - d_2, & |d_2| > \lambda \end{cases}$$

which are both easily verified to be non-expansive. Observe that equation (28) is the negative of equation (23) consistent with the formulation in equation (7) and the fact that x maps to $a_1$ in equation (22) and v maps to $a_2$ in equation (26).

Example Application—Learning A in BP and BPDN

As one example of an application of some of the processes and procedures discussed herein, the system may be configured to learn constraints in linear and quadratic programs from data by learning the measurement matrix A for the BP problem of equation (21) and BPDN problem of equation (22). A dataset may be constructed by randomly drawing an M×N matrix A* and producing network input-target samples (r, x*) by randomly building K-sparse vectors x* and computing the companion measurements r=A*x+z where K is drawn uniformly over the interval [$K_{min}$, $K_{max}$] and z is a noise vector with entries sampled from $\mathcal{N}(0, \sigma_2)$. The neural networks take measurements r as inputs and produce outputs $\hat{x}$ which solve BP or BPDN for the current parameter matrix A during the forward pass. The training objective is to minimize $\|\hat{x}-x^*\|_1$, i.e. to resolve the difference between the sparse vector $x^*$ which produces r using $A^*$ and the network output.

The networks may be trained using stochastic gradient descent with a learning rate of 0.01, a batch size of 64 and no momentum or weight decay terms. The training and validation splits in this example implementation comprise 256,000 and 10,000 samples, respectively.

Consistent with training neural networks via non-convex optimization, meaning gradient-based methods generally find local minima, several trials have been observed that disparate matrices A produce similar validation errors whereas the validation error at the global minima $A^*$ is slightly lower. This observation corroborates the fact that training linear and quadratic program parameters is also a non-convex optimization problem. Warm starting from $A^*$ corrupted by noise and finetuning repeatedly yielded $A^*$ as a solution.

Example Application—Learning D in TVDN Problems

As another example of an application of some of the processes and procedures discussed herein, the system may be configured to learn parameters in a signal processing algorithm from data by learning the denoising matrix D in equation (26). A dataset may be constructed by generating input-target samples (y,$x^*$) of piecewise constant signals $x^*$ and their noise corrupted companions y. The neural network takes y as input and produces output $\hat{x}$ which solves TVDN for the current denoising matrix D during the forward pass. The training objective is to minimize $\|\hat{x}-x^*\|_1$, i.e. to resolve the difference between the piecewise constant signal $x^*$ and the network output.

The examples in this section primarily serve to underscore the feasibility and numerical stability of unrolling constrained optimization algorithms within the deep learning paradigm, and secondarily as an interesting class of algorithms themselves. The ability to learn convex programs as essentially layers within a larger network, similar to learning affine or convolution layers, may enable many new neural network architectures and applications that can take advantage of such architectures.

Figure 7:
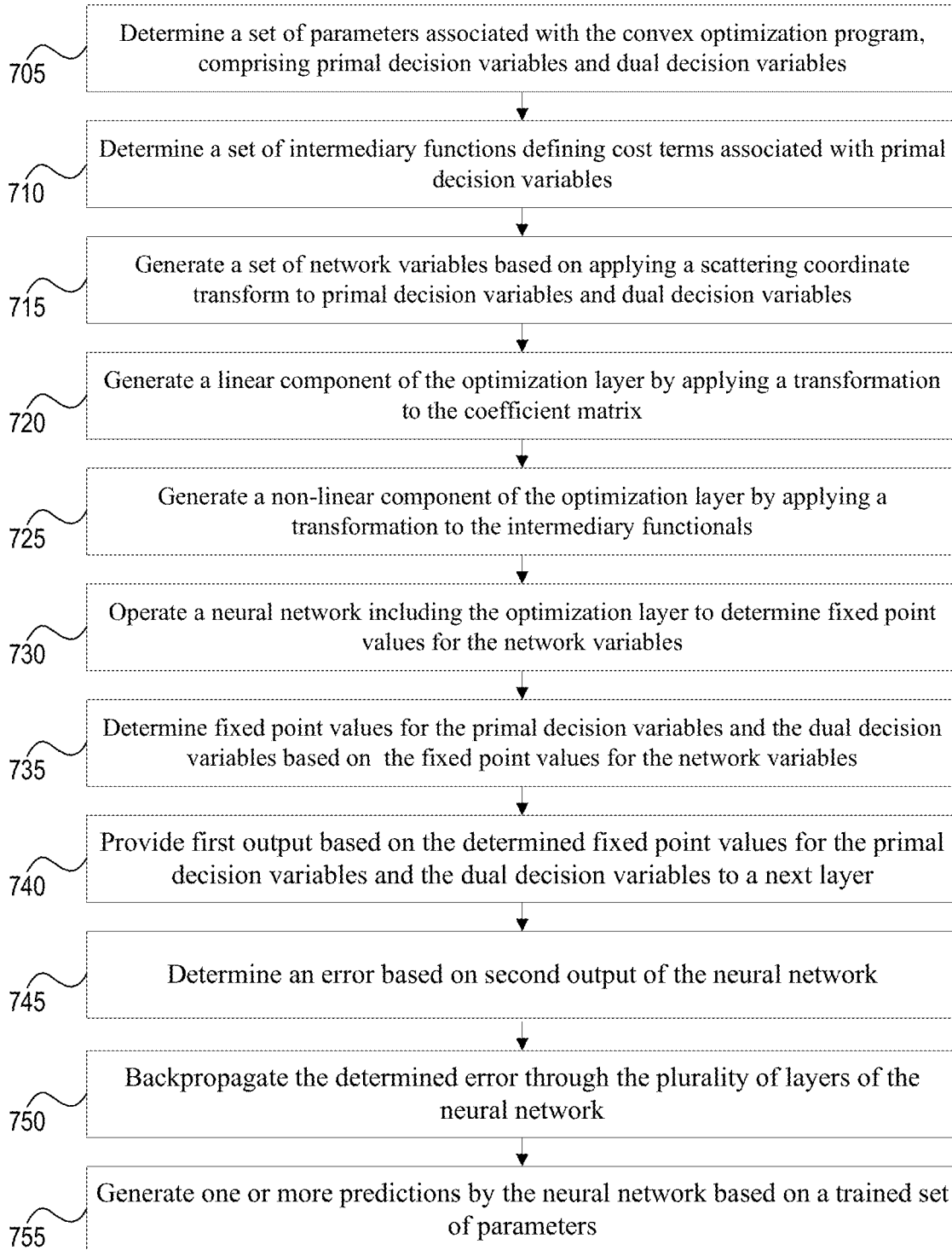
FIG. 7 depicts an exemplary method flow diagram according to one or more aspects of the disclosure.

In accordance with the above detailed description, aspects described herein may provide a computer-implemented method for embedding a convex optimization program as an optimization layer in a neural network architecture. Exemplary steps of such a method 700 are shown in FIG. 7.

At step 705, a computing device may determine a set of parameters associated with the convex optimization program. The set of parameters may include a vector of primal decision variables and a set of dual decision variables. A coefficient matrix may also be determined, which may correspond to one or more constraints of the convex optimization program.

At step 710, the computing device may determine a set of intermediary functions having values defined as equal to a cost term associated with corresponding values of the primal decision variables. The one or more constraints of the convex optimization program may define a range of permitted values and a range of unpermitted values. The cost term may be equal to infinity for unpermitted values of the primal decision variables and equal to other, non-infinite values for permitted values of the primal decision variables.

At step 715, the computing device may generate a set of network variables associated with the optimization layer based on applying a scattering coordinate transform to the vector of primal decision variables and the vector of dual decision variables. The network variables may comprise a vector corresponding to inputs to the optimization layer, and a vector corresponding to intermediate values of the optimization layer.

At step 720, the computing device may generate a linear component of the optimization layer by applying a transformation to the coefficient matrix.

At step 725, the computing device may generate a non-linear component of the optimization layer by applying a transformation to the intermediary functionals.

At step 730, the computing device may operate a neural network including the optimization layer, comprising the generated linear component and the non-linear component. The computing device may receive, by the optimization layer and from a prior layer of the neural network, input values corresponding to the inputs to the optimization layer. The computing device may iteratively compute, by the optimization layer, values for the network variables to determine fixed point values for the network variables.

At step 735, the computing device may determine fixed point values for the primal decision variables and the dual decision variables based on applying the inverse of the scattering coordinate transform to the fixed point values for the network variables.

At step 740, the computing device may provide, by the optimization layer, first output based on the determined fixed point values for the primal decision variables and the dual decision variables to a next layer of the neural network.

At step 745, the computing device may determine an error based on second output of the neural network, wherein the second output is based on the first output of the optimization layer. The second output may be an output of a last layer of the neural network.

At step 750, the computing device may backpropagate the determined error through the plurality of layers of the neural network. The backpropagating may comprise determining an updated set of parameters associated with the convex optimization program based on applying gradient descent to the linear component and the non-linear component.

At step 755, the computing device may generate one or more predictions by the neural network based on a trained set of parameters associated with the convex optimization program.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for embedding a convex optimization program as an optimization layer in a neural network architecture comprising a plurality of layers, the method comprising:

determining a set of parameters associated with the convex optimization program comprising associated primal decision variables and dual decision variables, wherein a coefficient matrix corresponding to one or more constraints of the convex optimization program imposes linear feasibility constraints on the decision variables;

generating, based on the coefficient matrix, a linear component of the optimization layer;
generating, based on a second transformation to a set of intermediary functions, a non-linear component of the optimization layer, wherein the second transformation is based on an intermediate value of the optimization layer;
iteratively determining, based on the linear component and non-linear component of the optimization layer and input values of the optimization layer and intermediate values of the optimization layer, fixed point values for the decision variables;
providing, by the optimization layer and based on the determined fixed point values for the decision variables, a first output to a next layer of the neural network architecture;
providing, by the optimization layer, a second output, wherein the second output is based on the first output;
determining, based on the second output, an error;
backpropagating the determined error through the plurality of layers; and
generating, by the neural network architecture and based on a trained set of parameters associated with the convex optimization program, one or more predictions.

2. The computer-implemented method of claim 1, further comprising:
determining the set of intermediary functions, wherein one function of the set of intermediary functions is equal to a cost term associated with a range of permitted values and a second function of the set of intermediary functions is equal to infinity for a range of unpermitted values; and
generating, based on applying a scattering coordinate transform to the decision variables, a set of network variables associated with the optimization layer, wherein the set of network variables comprises an input value of the optimization layer and the intermediate value of the optimization layer.

3. The computer-implemented method of claim 2, wherein the fixed point values for the decision variables are further determined by:
iteratively determining, based on the linear component and non-linear component of the optimization layer and the input values and intermediate values of the optimization layer, fixed point values of the network variables; and
determining, based on applying an inverse of the scattering coordinate transform to the fixed point values of the network variables, fixed point values for the decision variables.

4. The method of claim 1, wherein the backpropagating comprises determining an updated set of parameters associated with the convex optimization program based on applying gradient descent to the linear component and the non-linear component of the optimization layer.

5. The computer-implemented method of claim 1, wherein the one or more constraints of the convex optimization program define a range of permitted values and a range of unpermitted values.

6. The computer-implemented method of claim 1, wherein the neural network architecture is configured to generate predictions regarding speech recognition.

7. The computer-implemented method of claim 1, wherein the neural network architecture is configured to generate predictions regarding image recognition.

8. The computer-implemented method of claim 1, wherein the optimization layer has a direct form structure, from an input of the optimization layer, consisting of a single path comprising a single matrix multiplication followed by a non-linearity.

9. The computer-implemented method of claim 1, wherein the optimization layer has a residual form structure, from an input of the optimization layer, comprising:
a first path, comprising a single matrix multiplication followed by a non-linearity;
a second path, comprising an identity path from the input of the optimization layer; and
a weighted combination of the input and a product of the single matrix multiplication and the non-linearity.

10. The computer-implemented method of claim 1, wherein the convex optimization program is at least one of a linear optimization program or a quadratic optimization program.

11. A computing device comprising:
one or more processors; and
memory storing instructions that, when executed by the one or more processors, cause the computing device to:
assemble a neural network architecture comprising a plurality of layers by:
determining a set of decision variables as parameters associated with a convex optimization program, wherein a coefficient matrix corresponding to one or more constraints of the convex optimization program imposes constraints on the decision variables;
generating, based on the coefficient matrix, a linear component of an optimization layer;
generating, based on a second transformation to a set of intermediary functions, a non-linear component of the optimization layer;
generate, based on an input of the optimization layer, the optimization layer as a direct form structure;
receiving, by the optimization layer and from a prior layer of the neural network architecture, input values;
iteratively determining, based on the linear component and non-linear component of the optimization layer and the input values and intermediate values of the optimization layer, fixed point values for the decision variables;
providing, by the optimization layer and based on the determined fixed point values for the decision variables, a first output to a next layer of the neural network architecture;
providing, based on the first output of the neural network architecture, a second output of the neural network architecture; and
generating, by the neural network architecture and based on a trained set of parameters associated with the convex optimization program, one or more predictions.

12. The computing device of claim 11, wherein the instructions, when executed by the one or more processors, cause the computing device to:
determine, based on the second output of the neural network architecture and before generating the one or more predictions, an error; and
backpropagate the determined error through the plurality of layers by at least determining an updated set of parameters associated with the convex optimization program based on applying gradient descent to the linear and non-linear component of the optimization layer.

13. The computing device of claim 11, wherein the direct form structure comprises a single path comprising a single matrix multiplication followed by a non-linearity.

14. The computing device of claim 11, wherein the one or more constraints of the convex optimization program define a range of permitted values and a range of unpermitted values of the set of intermediary functions.

15. The computing device of claim 11, wherein the convex optimization program is at least one of a linear optimization program or a quadratic optimization program.

16. The computing device of claim 11, wherein the neural network architecture comprises at least one of a convolutional neural network, a recurrent neural network, or a feed forward neural network.

17. A non-transitory computer readable medium comprising instructions that, when executed by one or more processors, cause a computing device to perform steps, the steps comprising:
assembling a neural network architecture comprising a plurality of layers by:
determining decision variables as a set of parameters associated with a convex optimization program, wherein a coefficient matrix corresponding to one or more constraints of the convex optimization program imposes linear constraints on the decision variables;
generating, based the decision variables, a set of network variables associated with an optimization layer;
generating, based on the coefficient matrix, a linear component of the optimization layer;
generating, based on a set of intermediary functions, a non-linear component of the optimization layer;
generating, based on an input of the optimization layer, an optimization layer as a residual form structure;
receiving, by the optimization layer and from a prior layer of the neural network architecture, input values;
iteratively determining, based on the linear component of the optimization layer and the non-linear component of the optimization layer and the input values of the optimization layer, that the network variables satisfy a threshold;
determining, based on determining that the network variables satisfy the threshold, fixed point values for the decision variables;
providing, by the optimization layer and based on the determined fixed point values for the decision variables, a first output to a next layer of the neural network architecture;
providing, by the optimization layer and based on the first output, a second output;
determining, based on second output, an error;
backpropagating the determined error through the plurality of layers; and
generating, by the neural network architecture and based on a trained set of parameters associated with the convex optimization program, one or more predictions.

18. The non-transitory computer readable medium of claim 17, wherein the residual form structure wherein the residual form structure comprises:
a first path, comprising a single matrix multiplication followed by a non-linearity;
a second path, comprising an identity path from the input of the optimization layer; and
a weighted combination of the input and a product of the single matrix multiplication and the non-linearity.

19. The non-transitory computer readable medium of claim 17, wherein the backpropagating comprises determining an updated set of parameters associated with the convex optimization program based on applying gradient descent to the linear component and the non-linear component of the optimization layer.

20. The non-transitory computer readable medium of claim 17, wherein the set of network variables comprises an input value of the optimization layer and an intermediate value of the optimization layer.

* * * * *